United States Patent
Chan

(10) Patent No.: US 8,108,725 B2
(45) Date of Patent: Jan. 31, 2012

(54) HISTORY-BASED CONFLICT RESOLUTION

(75) Inventor: Wilson Wai Shun Chan, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 116 days.

(21) Appl. No.: 12/574,675

(22) Filed: Oct. 6, 2009

(65) Prior Publication Data

US 2011/0083043 A1   Apr. 7, 2011

(51) Int. Cl.
*G06F 11/00* (2006.01)
(52) U.S. Cl. .......... 714/26; 714/4.1; 714/38.1; 714/47.2
(58) Field of Classification Search ............... 714/2, 4.1, 714/25, 26, 38.1, 47.1, 47.2
See application file for complete search history.

(56) References Cited

U.S. PATENT DOCUMENTS

| | | | |
|---|---|---|---|
| 6,742,141 B1 * | 5/2004 | Miller | 714/26 |
| 7,600,160 B1 * | 10/2009 | Lovy et al. | 714/47.2 |
| 7,788,536 B1 * | 8/2010 | Qureshi et al. | 714/26 |
| 2007/0067678 A1 * | 3/2007 | Hosek et al. | 714/25 |

* cited by examiner

*Primary Examiner* — Robert Beausoliel, Jr.
*Assistant Examiner* — Joseph D Manoskey
(74) *Attorney, Agent, or Firm* — Hickman Palermo Truong & Becker LLP

(57) ABSTRACT

Processes in a cluster maintain a historical record of problem events as those events occur in the cluster. The record may describe (a) attributes of each event and (b) the resolution action that was performed to resolve each event. Whenever a new event occurs, a process determines whether any entries in the record reflect occurrences of an event with attributes like those of the new event. If a "matching" entry exists, then the process increments that entry's counter. If the historical record indicates that similar events have previously occurred more than a specified number of times, then the process may select and perform a resolution action that differs from the resolution action that is indicated in the entry. Additionally, patterns in the attributes of a recurring problem may be used to predict when the problem is likely to recur. Preventative actions may be taken to avoid recurrence of the problem.

20 Claims, 2 Drawing Sheets

HISTORY-BASED CONFLICT RESOLUTION

FIELD OF THE INVENTION

The present invention relates generally to resolving conflicts that arise from multiple processes attempting to access a resource simultaneously.

BACKGROUND

A "cluster" is the result of "clustering" computing resources together in such a way that they behave like a single resource. Clustering is often used for purposes of parallel processing, load balancing and fault tolerance. One common example of a cluster is a set of computers, or "nodes", that are configured so that they behave like a single computer. Each computer in the cluster has shared access to a set of resources. A resource is, generally, any item that can be shared by the computers in the cluster. A common example of a resource is a block of memory in which information is stored. The block of memory may be part of a node in the cluster or may be external to the cluster, such as a database block.

A cluster comprises multiple nodes that each executes an instance of a server that each facilitates access to a shared set of resources on behalf of clients of the cluster. One example of a cluster is a database cluster. A database cluster comprises multiple nodes that each executes an instance of a database server that each facilitates access to a shared database. Among other functions of database management, a database server governs and facilitates access to the particular database by processing requests by clients to access data in the database.

Because the several nodes of a cluster share access to a database, multiple nodes or database server instances might attempt to access the same data resource (e.g., data block on disk) concurrently with each other. One of the nodes might obtain a lock on the sought data resource before the other nodes do, thereby forcing the other nodes to wait for the lock-holding node to finish its work relative to the data resource and release the lock.

Sometimes, a node needs to obtain a lock on multiple separate data resources before that node can complete a transaction. For example, a transaction might involve deducting an amount from one bank account and adding that amount to another bank account. Such work often needs to be done atomically, such that neither bank account will be affected under circumstances in which the change cannot be made to one or the other of the banks accounts. The data for the first bank account might be stored in a first data block, while the data for the second bank account might be stored in a second data block. Under such circumstances, a database server instance might need to obtain a lock on both the first data block and the second data block before modifying the data in either data block. If some other instance holds a lock on either of the data blocks, then the database server instance typically will be forced to wait for the other instance to release its lock on the locked data block.

Difficulties sometimes arise in cases where multiple nodes end up waiting for the release of locks that another other node holds. For example, node "A" might need to obtain locks on resources "1" and "2" in order to perform a task. Node "B" might need to obtain locks on resources "2" and "3" in order to perform a task. Meanwhile, node "C" might need to obtain locks on resources "1" and "3" in order to perform a task. Theoretically, if all three nodes attempt to obtain locks on these resources at roughly the same time, then node "A" might end up with a lock on resource "1," while node "B" might end up with a lock on resource "2," while node "C" might end up with a lock on resource "3." Under such circumstances, all three nodes would be waiting for another of those nodes to release its lock on a resource. Node "A" would be waiting for node "B" to release a lock on resource "2" before node "A" could release the lock on resource "1." Node "B" would be waiting for node "C" to release a lock on resource "3" before node "B" could release the lock on resource "2." Node "C" would be waiting for node "A" to release a lock on resource "1" before node "C" could release the lock on resource "3." As a result, a deadlock condition occurs, in which all three nodes end up waiting indefinitely unless some outside intervention occurs.

Sometimes, these deadlock conditions can be detected automatically. For example, if a monitoring process determines that a database server instance has been waiting for an excessively long period of time, then the monitoring process may conclude (perhaps incorrectly, though) that the database server instance is involved in a deadlock condition. In order to break the deadlock, the monitoring process may take some action. For example, the monitoring process might instruct the apparently deadlocked database server instance to terminate itself by exiting gracefully. In response to such an instruction, the assumed-to-be-deadlocked server instance releases all of the data resource locks that it currently holds, and ceases execution. As a result, other database server instances that were involved in the same deadlock condition can obtain the terminated instance's released locks and resume their work.

The foregoing approach works sometimes. Other times, however, the reason why a particular database server instance is taking an excessively long time to complete its processing is actually due to some reason other than a bona fide deadlock condition. Sometimes, for example, the hardware configuration of a particular storage subsystem that the particular database server instance needs to access causes that access to be unusually slow, thereby causing the database server instance to take much longer than is normal to perform its work. A monitoring process, noticing the excessive amount of time that the database server instance has taken thus far in pursuit of its current task, might erroneously conclude that the database server instance is either deadlocked or "hung." In order to allow other database server instances to obtain locks on the resources on which the delayed server instance currently holds lock, the monitoring process may terminate the delayed server instance in the manner discussed above. However, under the situation described in the foregoing example, terminating the delayed server instance might actually exacerbate rather than solve the problem.

In the situation described above, after the lock-holding database server instance has been terminated, another server instance that was waiting to obtain a lock on the same resource will attempt to obtain that lock and access that same resource. However, if the reason why the terminated process was taking so long to complete its task relative to the resource was due to the fact that the resource is stored on a very slow piece of hardware, or on a piece of hardware that is being heavily accessed at the moment, then this other database server instance will probably experience the same delay that the terminated server instance did. The monitoring process might end up taking the same action—termination—relative to the other database server instance also. If many different database server instances are all seeking to access the same resource (possibly because the resource is or contains critical or popular data), then the ultimate outcome might involve the termination of most, if not all, of the database server instances in the cluster. In short, the whole cluster might be brought down when it ought not to have been.

Current approaches for dealing with these kinds of conflicts in a cluster suffer from shortcomings such as the type discussed above largely because current approaches for resolving conflicts treat each conflict detection and resolution as a separate, unrelated, independent incident. However, in reality, conflicts sometimes are related to each other. Sometimes, conflicts are self-repeating. Sometimes, multiple conflicts are all related to some temporal event. Because current approaches for detecting and resolving conflicts do not account for these possibilities, current approaches often take a significant amount of time, and do not actually determine or resolve the root cause of the problem (which may continue to repeat itself). Current approaches for conflict detection and resolution are somewhat defective in that they do not consider a high-level, overall view of the system, and in that they do not perform any kind of analysis to determine whether multiple problem incidents are related to each other.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
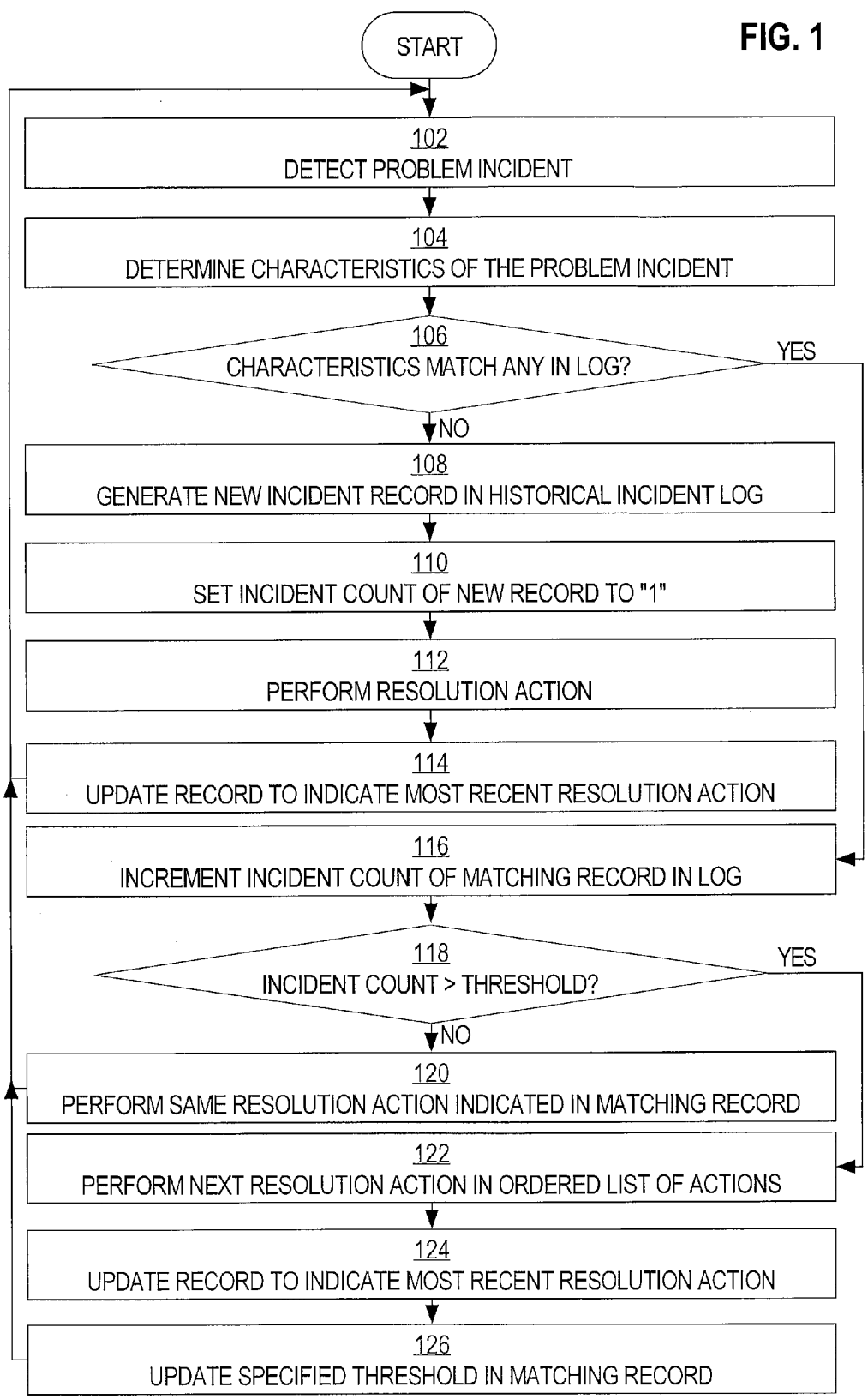
FIG. 1 is a flow diagram that illustrates an example of a technique for automatically resolving conflicts based on historical conflict resolution data, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Processes in a database cluster environment maintain a historical record of problem events as those events occur in the database cluster. The historical record may describe various attributes of each problem event. These attribute may include the time at which the event occurred, the date on which the event occurred, identities of the database resources involved in the problem, and a description of the problem event. The historical record also may indicate, for each problem event, the resolution action that was performed in an effort to resolve that problem event.

Whenever a new problem event occurs in the database cluster, before any action is taken to resolve the new problem event, a process consults the historical record. The process determines whether any entries in the historical record reflect occurrences of a problem event with the same or similar attributes as those of the new problem event. If such a matching entry exists, then the process increments a problem occurrence counter that is associated with that entry in the historical record. Alternatively, if no matching entry exists, then the process creates a new record for the problem event in the historical record, with a problem occurrence counter set to one.

If the historical record indicates that the same or similar problem events have occurred more than a specified number of times in the past, then the process may select and perform a resolution action that differs from the resolution action that is indicated in the problem event entry—since the problem is recurring, and the previous resolution action did not seem to halt the recurrence of the problem, the process attempts to try something different in an effort to permanently solve the problem and avoid future recurrences of the same problem.

Because the historical record indicates attributes of each problem event, such as the time and date at which the problem event occurred, patterns in the attributes of a recurring problem may be detected. These patterns may be used to predict when the problem is likely to recur in the future. Based on this prediction, preventative actions may be taken in the database system in an effort to avoid the recurrence of the problem in the future.

Cluster Environment

An embodiment of the invention may be implemented in an operating environment referred to as a cluster. One type of cluster in which embodiments may be implemented is a database cluster. As previously described, a database cluster comprises multiple nodes that each executes an instance of a database server ("server") that each facilitates access to a shared database. Each node comprises a combination of computing hardware, such as computing system 200 of FIG. 2, and a server instance. Each server instance comprises a combination of integrated software components and an allocation of computational resources (such as memory and processes) for executing the integrated software components on one or more processors of a node, where the combination of the software and computational resources are used to manage a particular common database on behalf of clients of the cluster.

The operating environment includes clients that are communicatively coupled to the cluster of database servers. The database servers are communicatively coupled to the shared database. The clients are applications or programs that cause execution of processes on the database cluster via a network, for example. A client may execute, for non-limiting examples, on a desktop computer or on an application server.

In the context of a database cluster, the database is a repository for storing data and metadata on a persistent memory mechanism, such as a set of hard disks. Such data and metadata may be stored in the database logically, for example, according to relational database constructs, multidimensional database constructs, or a combination of relational and multidimensional database constructs. When a server accesses data from the shared database, it typically copies the data into the volatile memory of the node on which the server is executing. For example, the data is copied into the node's cache memory for manipulation purposes. Another server on another node may subsequently access the data, either from the other node's cache memory or from persistent storage, depending on the database architecture.

Resolving Problems Using on a Historical Incident Log

According to a technique described herein, different resolution actions are attempted under circumstances where problems appear to be recurring, and under circumstances in which previously taken resolution actions did not appear to succeed at permanently solving a problem that appears to be recurring.

FIG. 1 is a flow diagram that illustrates an example of a technique for automatically resolving conflicts based on historical conflict resolution data, according to an embodiment of the invention. However, various embodiments of the invention may include operations that are additional or alternative to those shown in the example. Furthermore, alternative embodiments of the invention may omit one or more operations demonstrated in the example.

In block 102, a problem incident is detected. For example, a monitoring process that executes within a database server cluster may detect a problem. The problem might be the fact that a particular database server instance within the cluster has taken longer than a specified threshold amount of time to complete a task on which the particular database server instance is currently working, for example.

In block 104, characteristics of the detected problem incident are determined. For example, the monitoring process discussed above may determine the characteristics of the problem. In one embodiment of the invention, these characteristics include (a) the time-of-day at which the problem incident occurred, (b) identities of processes (e.g., database server instance processes) that were involved in the problem incident, (c) resources (either physical or logical or both) that were involved in the problem incident (e.g., hard disk drives, latches, locks, etc.), and (d) a description of the problem incident (e.g., an error number if one is available, and/or a graph that illustrates the dependencies in a hang or deadlock graph if the incident appears to be related to a hung process or a deadlocked set of processes).

In block 106, a determination is made as to whether at least some of the characteristics of the problem incident match any of the characteristics of any previously occurring problem incidents as represented in a historical incident log. For example, the monitoring process may compare the incident characteristics determined in block 104 with incident characteristics of other incidents that have been stored in a historical incident log. More information on the creation and population of the historical incident log follows below in the discussion of block 108. Based on the number of characteristics that match, and the extent to which those characteristics match, the monitoring process may either (a) determine that the current problem incident matches a previous problem incident reflected in the historical incident log or (b) determine that the current problem incident does not sufficiently match any previous problem incident reflected in the historical incident log. In one embodiment of the invention, if at least a specified quantity of the two incidents' characteristics are the same, or within a specified range of each other, then the two incidents are determined to match each other. If the monitoring process determines that the current problem incident's characteristics match those of a previously occurring incident in the historical incident log, then control passes to block 116. Otherwise, control passes to block 108.

In block 108, assuming that the current problem incident's characteristics do not sufficiently match those of any previously occurring incident reflected in the historical incident log, a new problem incident record is created and populated in the historical incident log. For example, the monitoring process may generate and populate the new record by adding a new entry to the log and setting the fields of the log equal to the current problem incident's characteristics. The new entry may contain a separate field for each of the different characteristics discussed above with reference to block 104. Control passes to block 110.

In block 110, an incident count in the newly created incident record is set to "1." For example, the monitoring process may place a value of "1" in a separate field, within the incident record created in block 108, to indicate that one incident of the specific problem represented by the incident record has been detected so far. Control passes to block 112.

In block 112, a resolution action is automatically performed in an attempt to resolve the current problem incident. In one embodiment of the invention, a stored user-generated mapping between (a) a problem incident type and (b) an ordered list of proposed problem resolutions exists. For each different problem type, the mapping may map that problem type to a different ordered list of proposed problem resolutions. For each different problem type, the mapping may indicate one or more characteristics of that problem type. In one embodiment of the invention, the problem type of the current problem incident is determined by comparing the current problem incident's characteristics with those that are associated with the various problem types in the mapping. In such an embodiment of the invention, the problem type having the most characteristics in common with the current problem incident is deemed to be the current problem incident's problem type. In one embodiment of the invention, after the current problem incident's problem type has been determined, the first-ordered resolution action in the ordered list that is mapped to the current problem incident's problem type is performed. For example, if the current problem incident's problem type is "deadlock," then the first-ordered resolution action in the ordered list that is mapped to that problem type might be "terminate deadlocked process," in which case the monitoring process might instruct a database server instance that is involved in the deadlock to terminate itself. Control passes to block 114.

In block 114, a "most recent resolution action" field in the matching incident record is updated to indicate the identity of the resolution action that was performed in block 112. For example, if the monitoring process instructed the database server instance to terminate itself, then the monitoring process may populate the most recent resolution action field with data that indicates that the action taken was to terminate the database server instance. Control then passes back to block 102, in which a new problem incident may be detected.

Alternatively, in block 116, assuming that the current problem incident's characteristics sufficiently match those of a previously occurring incident reflected in the historical incident log, the incident count of the matching incident record is incremented by one. For example, if the monitoring process determines that the current problem incident has occurred once before, as indicated by a value of "1" in the incident count field of the matching incident record, then the monitoring process may increment the incident count field of the matching incident record to "2," thereby indicating that the problem incident has been detected twice. Control passes to block 118.

In block 118, a determination is made as to whether the incident count represented in the matching incident record's incident count field exceeds a specified threshold. For example, the monitoring process may determine whether the matching incident record's incident count is greater than the specified value (in one embodiment of the invention) of 4. If the incident count is greater than the specified threshold, then control passes to block 122. Otherwise, control passes to block 120.

In block 120, assuming that the incident count of the matching incident record does not exceed the specified threshold, the same resolution action that is indicated in the matching incident record's "most recent resolution action"

field (which is discussed above in relation to block 114) is performed again in an effort to resolve the current problem incident. For example, if the matching incident record's most recent resolution action field indicates that the last time the same problem incident occurred, the database server instance encountering the problem incident was terminated, then the monitoring process may once again instruct the database server instance encountering the problem incident to terminate itself (even if the current problem incident involves a different database server instance than the last such problem incident of that type). Control then passes back to block 102, in which a new problem incident may be detected.

Alternatively, in block 122, assuming that the incident count of the matching incident record exceeds the specified threshold, the next as-of-yet-unattempted resolution action in the ordered list of proposed resolution actions mapped to the current problem incident's problem type is automatically performed in an attempt to resolve the current problem incident. The ordered list of proposed resolution actions is discussed above in relation to block 112.

For example, if the current problem incident's problem type is "deadlock," and if the first-ordered resolution action in the list has already been performed, then the monitoring process might perform the second-ordered resolution action in the ordered list that is mapped to that problem type. If the first-ordered resolution action for the "deadlock" problem type was "terminate deadlocked process," then the second-ordered resolution action might be instructing a different database server instance that is involved in the deadlock to terminate itself. The third-ordered resolution action might be to forcefully kill (without instructing the database server instances themselves) all of the database server instance processes that are involved in the deadlock.

For another example, if the first-ordered resolution action in the list was "perform garbage collection" in an effort to free up storage space, then the monitoring process might perform the second-ordered resolution action, which might be "extend tablespace size." The third-ordered resolution might be "restructure tablespace."

In block 124, a "most recent resolution action" field in the matching incident record is updated to indicate the identity of the resolution action that was performed in block 122. Control passes to block 126.

In block 126, the specified threshold discussed above with reference to block 118 is updated. For example, if the specified threshold was "4," then the monitoring process may update the specified threshold to "9." In one embodiment of the invention, each separate problem incident record in the historical incident log contains a separate an independent threshold value that is updated whenever a new resolution action is performed relative to that particular program incident. Control then passes back to block 102, in which a new problem incident may be detected.

Thus, when the same problem appears to be recurring, a different resolution action than the previously attempted resolution actions can be tried. Instead of terminating each process that encounters a particular problem, such as excessively lengthy disk access time, an embodiment of the invention tries a solution other than process termination after determining that process termination does not prevent the particular problem from recurring. Beneficially, this technique has a better chance of resolving the root cause of the problem instead of merely temporarily remedying only the symptoms of that root cause. Furthermore, the technique is less likely to result in all of the database server instances of a cluster being terminated due to slow storage access times that may result from a hardware configuration.

Forecasting Problems Based on Historical Data

In one embodiment of the invention, the historical incident log's data is used not only to attempt to resolve problems that are occurring, but also to predict when problems having similar characteristics might recur in the future. The characteristics of the problem incidents recorded in the log can be used to predict which processes are likely to be prone to experience those problem incidents again. The characteristics of the problem incidents recorded in the log can be used to determine a pattern of times of day at which those problem incidents seem to occur regularly, and to predict the times of day at which those problem incidents are likely to recur. Certain types of problem incidents may be related to regularly occurring temporal events. For example, a flood of users might attempt to log-in to a database system at a certain time of day every weekday, thereby causing a reduction in system performance. For another example, a batch job executed in a database system at a certain time of day might regularly run out of disk space. By examining the historical incident log, a human administrator may be able to modify certain aspects of the database system (e.g., by allocating partitions to different sets of disk drives, etc.) in order to decrease the likelihood that those problem events can recur. Thus, the mere recording of the problem incidences can be of benefit in formulating a plan for preventing like problem incidences in the future.

Where problem incidences appear to be occurring at random times, an administrator or an automated process can attempt to match characteristics of those problem incidences with those of other incidences that are recording in the historical incidence log. In this manner, incidences may be detected earlier and resolved more quickly than they otherwise would have been in the absence of the historical incidence log described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
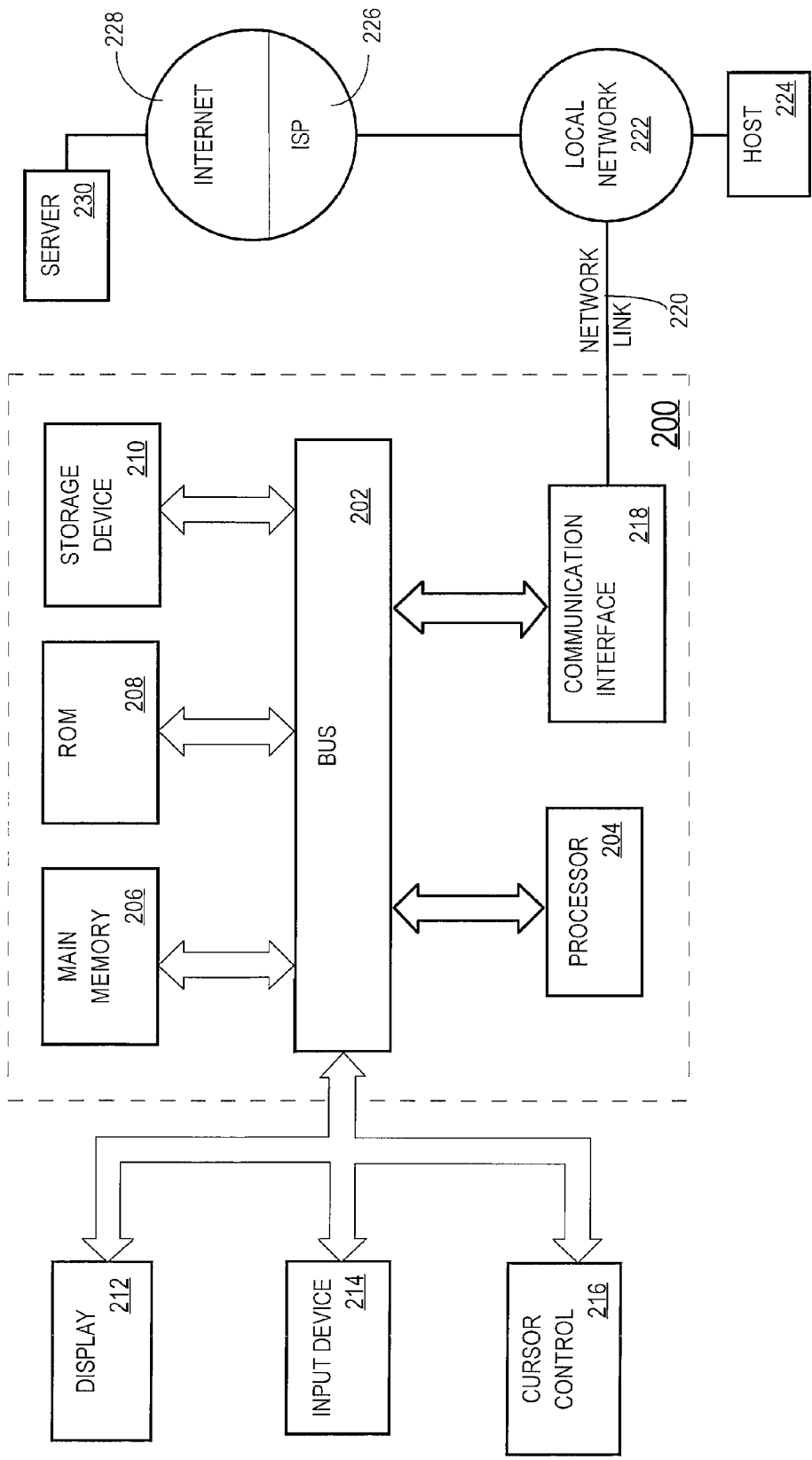
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
    detecting an occurrence of a particular problem event in a cluster of nodes;

determining whether any entry in a historical record of problem events indicates characteristics that are the same as characteristics of the particular problem event;

in response to determining that a particular entry in the historical record indicates characteristics that are the same as characteristics of the particular problem event, determining, based on the entry, both (a) a first resolution action that was previously performed in an attempt to resolve a problem reflected in the particular entry and (b) a number of previous times that the particular problem event occurred;

determining whether the number of previous times that the particular problem event occurred is greater than a specified threshold; and in response to determining that the number of previous times that that the particular problem event occurred is greater than the specified threshold, performing a second resolution action that differs from the first resolution action instead of performing the first resolution action again, thereby preventing performance of the first resolution action relative to the particular problem event;

wherein the second resolution action is designed to resolve the particular problem event; and wherein the steps are performed by one or more computing devices.

2. The method of claim 1, wherein determining whether any entry in the historical record indicates characteristics that are the same as characteristics of the particular problem event comprises determining whether any entry indicates a time-of-day that is the same as a time-of-day at which the particular problem event occurred.

3. The method of claim 1, wherein determining whether any entry in the historical record indicates characteristics that are the same as characteristics of the particular problem event comprises determining whether any entry indicates a database server instance process that is the same as a database server instance process relative to which the particular problem event occurred.

4. The method of claim 1, wherein determining whether any entry in the historical record indicates characteristics that are the same as characteristics of the particular problem event comprises determining whether any entry indicates a readable database data structure that is the same as a readable database data structure relative to which the particular problem event occurred.

5. The method of claim 1, wherein determining whether any entry in the historical record indicates characteristics that are the same as characteristics of the particular problem event comprises determining whether any entry indicates an error identifier that is the same as an error identifier associated with the particular problem event.

6. The method of claim 1, wherein detecting the occurrence of the particular problem event in the cluster of nodes comprises determining that a database server instance executing on a particular node in the cluster is taking longer than an expected amount of time to complete a task.

7. The method of claim 1, wherein detecting the occurrence of the particular problem event in the cluster of nodes comprises determining that a database server instance executing on a particular node in the cluster is taking longer than an expected amount of time to access data on a storage device.

8. The method of claim 1, wherein the first resolution action involves instructing a database server instance to terminate itself, and wherein the second resolution action does not involve instructing a database server instance to terminate itself.

9. The method of claim 1, wherein the first resolution action involves instructing a first database server instance to terminate itself, and wherein the second resolution action involves instructing a second database server instance to terminate itself; wherein the second database server instance is separate from the first database server instance but executes concurrently with the first database server instance.

10. A computer-implemented method comprising steps of:

in response to detecting an occurrence of a first problem incident, determining a set of characteristics that indicates at least a time of day at which the first problem incident occurred;

matching the problem incident against a log of other problem incidents to determine a second problem incident that occurred within a same time-of-day range as the first problem incident;

determining, based on the log, a set of resolution actions that have already been performed in an effort to solve the second problem incident; and performing a particular resolution action, which has not yet been performed in an effort to solve the second problem incident, in an attempt to solve the first problem incident;

wherein the steps are performed by one or more computing devices.

11. The method of claim 10, further comprising:

updating a log record to indicate that the particular resolution action was a most recently performed resolution action in an attempt to solve an problem incident that is of a same problem type as the first and second problem incidents.

12. The method of claim 10, further comprising:

selecting, as the particular resolution action, a resolution action that is contained in an ordered list of resolution actions that are mapped to a problem type of the first problem incident;

wherein the ordered list of resolution actions contains prospective resolution actions in an order in which those resolution actions are to be attempted in an effort to solve problem incidents of the problem type.

13. A volatile or non-volatile computer-readable storage medium storing instructions which, when executed by one or more processors, cause said one or more processors to perform steps comprising:

detecting an occurrence of a particular problem event in a cluster of nodes;

determining whether any entry in a historical record of problem events indicates characteristics that are the same as characteristics of the particular problem event;

in response to determining that a particular entry in the historical record indicates characteristics that are the same as characteristics of the particular problem event, determining, based on the entry, both (a) a first resolution action that was previously performed in an attempt to resolve a problem reflected in the particular entry and (b) a number of previous times that the particular problem event occurred;

determining whether the number of previous times that the particular problem event occurred is greater than a specified threshold; and in response to determining that the number of previous times that that the particular problem event occurred is greater than the specified threshold, performing a second resolution action that differs from the first resolution action instead of performing the first resolution action again, thereby preventing performance of the first resolution action relative to the particular problem event;

wherein the second resolution action is designed to resolve the particular problem event.

14. The computer-readable medium of claim 13, wherein determining whether any entry in the historical record indicates characteristics that are the same as characteristics of the particular problem event comprises determining whether any entry indicates a time-of-day that is the same as a time-of-day at which the particular problem event occurred.

15. The computer-readable medium of claim 13, wherein determining whether any entry in the historical record indicates characteristics that are the same as characteristics of the particular problem event comprises determining whether any entry indicates a database server instance process that is the same as a database server instance process relative to which the particular problem event occurred.

16. The computer-readable medium of claim 13, wherein determining whether any entry in the historical record indicates characteristics that are the same as characteristics of the particular problem event comprises determining whether any entry indicates a readable database data structure that is the same as a readable database data structure relative to which the particular problem event occurred.

17. The computer-readable medium of claim 13, wherein detecting the occurrence of the particular problem event in the cluster of nodes comprises determining that a database server instance executing on a particular node in the cluster is taking longer than an expected amount of time to complete a task.

18. The computer-readable medium of claim 13, wherein the first resolution action involves instructing a database server instance to terminate itself, and wherein the second resolution action does not involve instructing a database server instance to terminate itself.

19. The computer-readable medium of claim 13, wherein the first resolution action involves instructing a first database server instance to terminate itself, and wherein the second resolution action involves instructing a second database server instance to terminate itself; wherein the second database server instance is separate from the first database server instance but executes concurrently with the first database server instance.

20. A volatile or non-volatile computer-readable storage medium storing instructions which, when executed by one or more processors, cause said one or more processors to perform steps comprising:
   in response to detecting an occurrence of a first problem incident, determining a set of characteristics that indicates at least a time of day at which the first problem incident occurred;
   matching the problem incident against a log of other problem incidents to determine a second problem incident that occurred within a same time-of-day range as the first problem incident;
   determining, based on the log, a set of resolution actions that have already been performed in an effort to solve the second problem incident; and
   performing a particular resolution action, which has not yet been performed in an effort to solve the second problem incident, in an attempt to solve the first problem incident.

* * * * *

UNITED STATES PATENT AND TRADEMARK OFFICE
CERTIFICATE OF CORRECTION

| | | |
|---|---|---|
| PATENT NO. | : 8,108,725 B2 | Page 1 of 1 |
| APPLICATION NO. | : 12/574675 | |
| DATED | : January 31, 2012 | |
| INVENTOR(S) | : Chan | |

It is certified that error appears in the above-identified patent and that said Letters Patent is hereby corrected as shown below:

IN THE CLAIMS:

In column 11, line 17, in Claim 1, after "times" delete "that".

In column 12, line 62, in Claim 13, after "times" delete "that".

Signed and Sealed this
First Day of May, 2012

David J. Kappos
*Director of the United States Patent and Trademark Office*